United States Patent [19]

Fox

[11] 3,938,074
[45] Feb. 10, 1976

[54] FUEL ECONOMY INDICATOR
[75] Inventor: Clarence D. Fox, Decatur, Ill.
[73] Assignee: Borg-Warner Corporation, Chicago, Ill.
[22] Filed: Dec. 12, 1974
[21] Appl. No.: 532,075

[52] U.S. Cl............... 340/52 R; 340/262; 116/39; 73/488
[51] Int. Cl.² .......................................... G08B 21/00
[58] Field of Search ........ 340/52 R, 52 D, 52 F, 53, 340/62, 262, 263; 73/488, 489; 116/39

[56] References Cited
UNITED STATES PATENTS
3,281,783   10/1966   Adams ................................. 340/53

Primary Examiner—Alvin H. Waring
Attorney, Agent, or Firm—Herman E. Smith

[57] ABSTRACT

A compact fuel economy indicator employs illuminated symbols such as colored lenses to indicate relative fuel economy. In one embodiment a series of lenses is moved with respect to a fixed lamp while in a second embodiment a lamp is moved with respect to the series of lenses for increasing the intensity of illumination of the appropriate lens.

7 Claims, 5 Drawing Figures

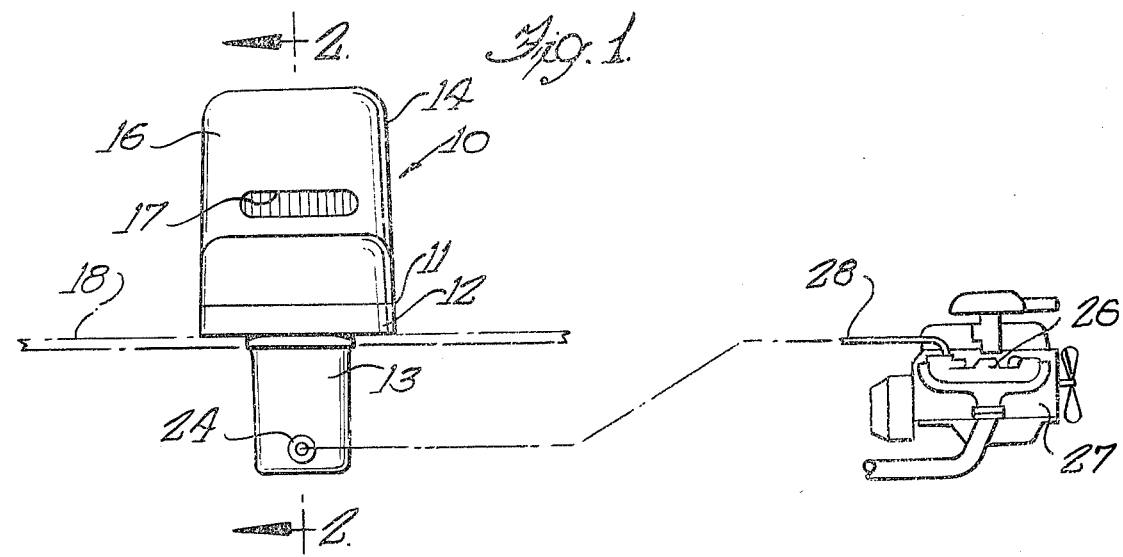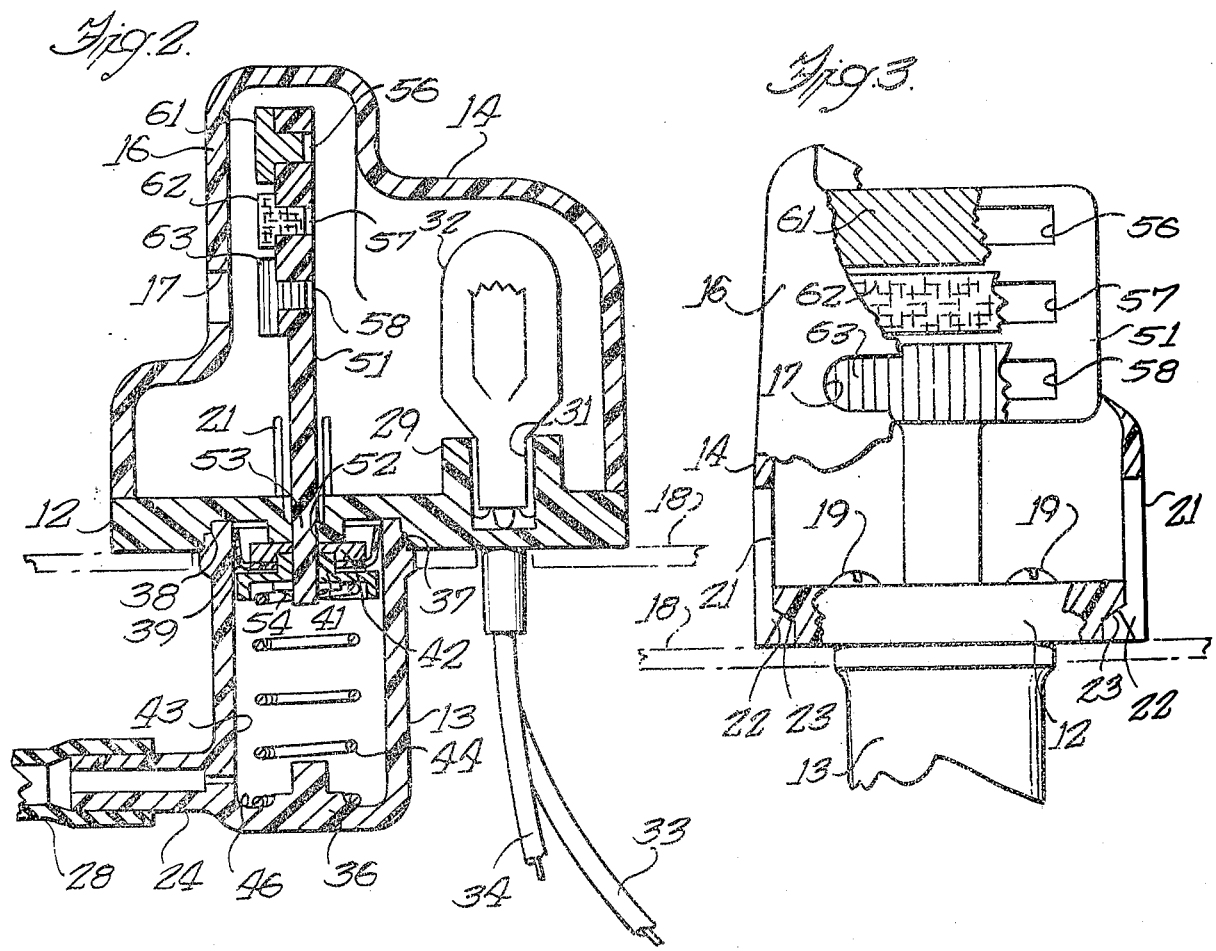

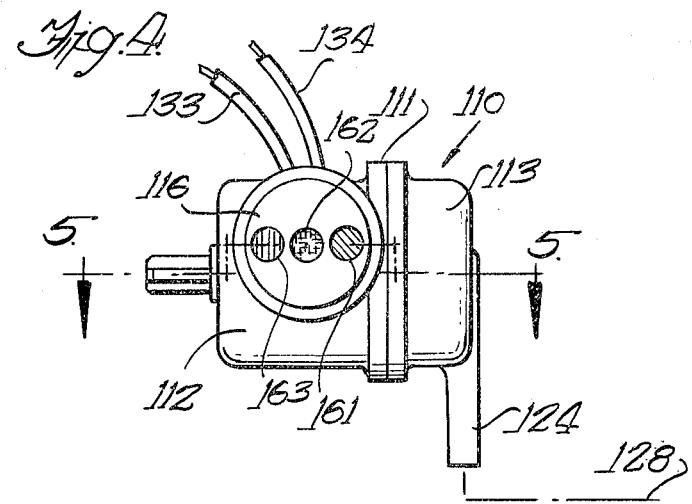
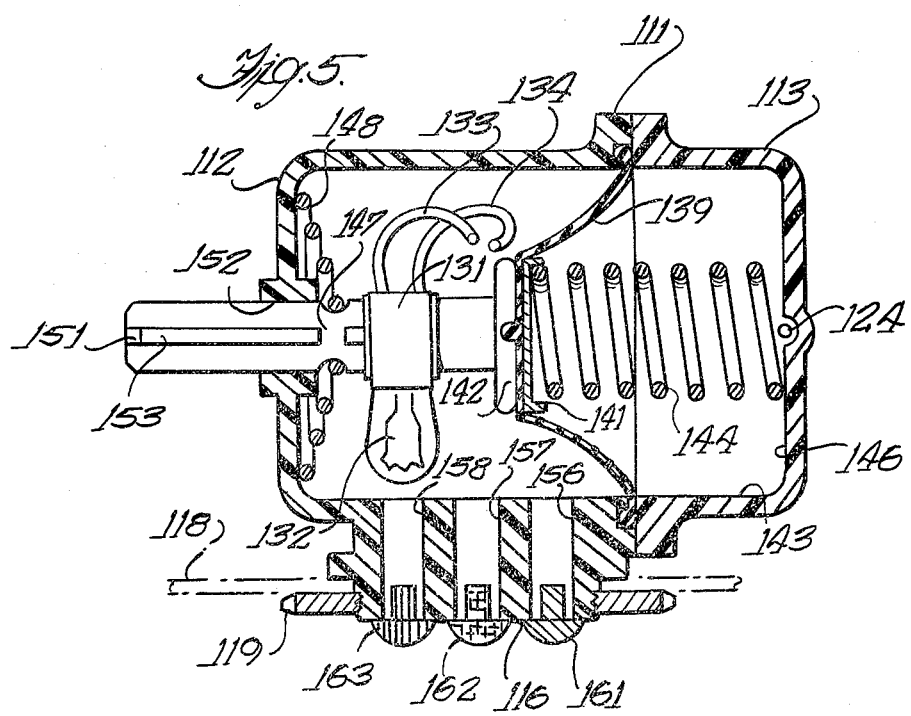

FUEL ECONOMY INDICATOR

BACKGROUND OF THE INVENTION

1. Field of the Invention.

The present invention relates to indicator devices and more particularly to fuel economy indicator devices for use with internal combustion engines.

2. Prior Art.

It is known to provide a vacuum gage connected to the induction manifold of an internal combustion engine wherein the manifold depression can be interpreted as an indication of fuel economy. Such devices often include an indicator needle, movable with respect to a dial for indicating the degree of manifold depression or relative fuel economy. Interpretation of such devices requires concentrated attention on the part of the engine operator which can be objectionable particularly where the engine is mounted in a motor vehicle.

It is also known to provide one or more electrical contact switches which open and close responsive to changes in manifold depression, the switches being connected to indicator lamps. These latter mentioned devices overcome the problem of concentrated attention on the part of the operator but are subject to the objection that the desired number of switch-lamp pairs are expensive, occupy too much space and may malfunction as a result of frequent switch actuation.

SUMMARY OF THE INVENTION

A principal objective of the present invention is to provide an improved fuel economy indicator in which a group of lucid symbols and a light source are caused to partake of relative motion as a function of relative fuel economy. the resulting apparatus is reliable in operation, compact in size, economical to manufacture and displays visibly distinct illuminated symbols indicative of relative fuel economy during operation of an engine to which the device is connected.

BRIEF DESCRIPTION OF THE DRAWINGS

FIG. 1 is an elevation view of one embodiment of a fuel economy indicator according to the present invention;

FIG. 2 is a section view to enlarged scale taken along the line 2—2 of FIG. 1;

FIG. 3 is an enlarged fragmentary view similar to FIG. 1 having portions broken away to reveal details of construction of the device;

FIG. 4 is an elevation view of another embodiment of fuel economy indicator according to the present invention; and FIG. 5 is a section view to enlarged scale taken along the line 5—5 of FIG. 4.

DESCRIPTION OF THE PREFERRED EMBODIMENTS

Referring now in more detail to the drawings, particularly FIGS 1–3 thereof, the reference character 10 indicates a fuel economy indicator device according to one embodiment of the invention. The body 11 of indicator device 10 includes a base member 12, an actuating means 13 and a cover member 14. The cover member 14 includes a panel portion 16 which includes a window 17 arranged for display of a symbol indicative of relative fuel economy. The device can be secured to a mounting surface 18 as by mounting screws 19 or by means of an adhesive or other well known means.

Cover member 14 is provided with a pair of spring fingers 21 including shoulders 22 arranged for engaging corresponding notched portions 23 of base member 12. Thus the cover member 14 can be removed from and replaced on base member 12 easily. Cover member 14 can be secured to the devices by other well known means. Actuator means 13 includes a connector 24 arranged for connecting the device to the fuel induction system 26 of an internal combustion engine 27 as by means of a tube 28.

Referring now to FIG. 2, base member 12 has a boss portion 29 which includes a socket 31 having appropriate electrical contacts for a luminous source such as a lamp 32. Electrical conductor leads 33, 34 extend into socket 31 for connection to the lamp contacts.

As shown in FIG. 2, actuating means 13 is in the form of an expansible chamber vacuum motor. The shell 36 of vacuum motor actuating means 13 is substantially cylindrical in shape having a stepped annular shoulder construction 37 engaging a similar recessed portion 38 of base 12. Shell 36 may be rotated in base portion 12 to provide the desired orientation of connection portion 24 and then secured in place. A seal 39 is secured between a pair of washer members 41, 42 and forms a slidable fluid tight seal with inner surface 43 of shell 36. A return spring 44 is engaged between a bottom portion 46 of shell 36 and washer member 41 urging the washers 41, 42 and seal 39 toward base member 12.

A slidable holder 51 includes a rod portion 53 extending through a slot 52 in base 12 which is secured to the washer 41 by means of a spring clip 54. Holder 51 includes a series of slots, here shown as three in number, 56, 57, 58. A series of lucidly distinct symbols such as differently colored translucent lenses 61, 62 63 is mounted in respective slots 56, 57, 58. As shown in the drawing the symbols are hatch lined to indicate the color red for lens 63, yellow for lines 62, and green for lens 61. Other forms of symbols may be employed, if desired, however it has been found that distinctly colored translucent lenses are readily visible and easily interpreted and are therefore desirable for use in small instruments.

OPERATION OF THE FIRST EMBODIMENT

The fuel economy indicator device 10 is connected to the intake manifold of induction system 26 by means of a tube 28 connected to vacuum motor actuator 13. It is well known that manifold depression in the intake manifold of an internal combustion engine is an indicator of the amount of fuel being consumed by the engine, a weaker subatmospheric pressure or depression indicating a greater fuel consumption while a stronger subatmospheric pressure or depression indicates less fuel consumption.

At wide open throttle where fuel consumption is greatest, the weak manifold depression acting through tube 28 is unable to overcome the force of spring 44 with the result that holder 51 is in the position shown in FIG. 2. In this position the red lens 63 is positioned between window 17 and lamp 32 where it receives the greatest intensity of illumination and is visible through the window to indicate high fuel consumption and relatively poor fuel economy. As the throttle of engine 27 is moved toward closed, requiring less fuel and creating a stronger manifold depression, the seal 39, washers 41, 42 and holder 51 are moved against the force of spring 44. As the rod portion of the holder is retracted through the base, the lenses are moved past window 17 so that the yellow lens 62 and then the green lens 61 becomes illuminated and visible through the window indicating intermediate and good fuel economy. As shown in the drawing the yellow lens 62 is narrower than the adjacent lenses indicating a transition zone between poor and good fuel economy. The holder 51 is thus extensible and retractible with respect to base portion 12 in response to changes in manifold depression. Movement of holder 51 results in display of various lenses through window 17 providing a visible indication of relative fuel economy.

DESCRIPTION OF THE SECOND EMBODIMENT

A second embodiment of fuel economy indicator device 110 is shown in FIGS. 4 and 5. In the second embodiment a series of distinct symbols are fixed with respect to the body and receive varying intensity of illumination from a movable luminous source, whereas in the first embodiment the series of symbols are movable with respect to a fixed luminous source for varying the intensity of illumination.

The body 111 of indicator device 110 includes a main portion 112 and an actuator portion 113. Main portion 112 includes a panel portion 116. A series of apertures 156, 157, 158 are formed in panel portion 116. Distinctly colored translucent lenses 161, 162, 163 are secured in respective apertures 156, 157, 158. Panel portion 116 extends through an aperture in a mounting sheet 118, the device being secured to the mounting sheet by means of a bezel nut 119.

A diaphragm 139 is secured around its perimeter to the junction of body portions 112, 113 to form an expansible chamber vacuum motor. A connector portion 124 provides communication between the interior 143 of the vacuum motor and a line 128 which connects with the intake manifold of a fuel induction system similar to the arrangement shown in FIG. 2. A return spring 144 extends between an end surface 146 of body portion 113 and a plate 141 engaging diaphragm 139.

Body portion 112 includes a slot 152 through which extends a slidable rod 151 having a rib 153 thereon. The rod and rib are notched as at 147 to support an end of a balance spring 148. Rod 151 includes a head 142 secured to diaphragm 139. A lamp 132 is inserted in a lamp socket 131 which is secured to rod 151 for movement therewith. A pair of electrical leads 133, 134 are connected to lamp socket 131 and extend externally of the body through body portion 112.

OPERATION OF THE SECOND EMBODIMENT

At wide open throttle the manifold depression communicated to vacuum motor actuator 113 is too weak to overcome the force of return spring 144, with the result that lamp 132 is in the position shown in FIG. 5 where it illuminates red lens 163 to indicate great fuel consumption and poor fuel economy. As the engine throttle is moved toward closed, the fuel consumption is reduced and the manifold depression increases with the result that diaphragm 139 compresses return spring 144 causing rod 151 and lamp 132 to move toward the right as viewed in FIG. 5. As the lamp is moved toward the right, the yellow lens 162 and then the green lens 161 receive more intense illumination indicating, respectively, intermediate and good fuel economy. As lamp 132 is moved behind the series of lens 161, 162, 163 in response to changes in manifold depression, the intensity of illumination of the lenses changes accordingly to provide an indication of relative fuel economy.

What is claimed is:
1. A fuel economy indicator device for use with an internal combustion engine having a fuel induction system,
    said device including a body having actuating means secured thereto, said actuating means being arranged for connection to said induction system and adapted for actuating movement in response to pressure changes in said induction system;
    luminous means;
    and spaced lucidly distinct symbols disposed adjacent said luminous means, each symbol representing a condition of relative fuel economy, said symbols and said luminous means being operatively connected to said body and said actuating means for relative movement in response to actuating movement of said actuating means,
    whereby respective of said spaced symbols receive varying intensity of illumination responsive to changes in induction system pressure, automatically providing a distinct indication of relative fuel economy during engine operation.

2. A fuel economy indicator device according to claim 1, wherein said symbols are provided by means of distinctly colored translucent lenses selected for indicating different condition of relative fuel economy.

3. A fuel economy indicator device according to claim 1, wherein said body includes a panel portion, said panel portion including a window arranged for display of a respective symbol.

4. A fuel economy indicator device according to claim 1, wherein said body includes a panel portion, said panel portion including a window arranged for display of a respective symbol, said symbols being mounted in series on a movable holder adjacent said window, said holder being operatively connected to said actuating means for displacement of said series of symbols with respect to said window and said luminous means.

5. A fuel economy indicator device according to claim 1, wherein said body includes a base member, said luminous means and said actuating means being secured to said base member, a rod member disposed adjacent said luminous means and connected to said actuating means arranged for extensible and retractible movement with respect to said base member in response to pressure changes in said induction system, said symbols being mounted on said rod member, and a cover member adapted for connection to said base member, said cover member enclosing said rod member and said luminous means, said cover member including an aperture arranged and disposed for display of respective symbols in response to extensible and retractible movement of said rod member.

6. A fuel economy indicator device according to claim 1, wherein said body includes a panel portion, said panel portion including a series of windows displaying respective of said symbols, said luminous means being mounted for movement with respect to said series of windows for illuminating respective symbols in response to changes in induction system pressure.

7. A fuel economy indicator device according to claim 1, wherein said actuating means includes an impervious diaphragm mounted for cooperation with a first portion of said body defining expansible chamber vacuum motor means, a rod slideably mounted in said body and operatively engaged with said diaphragm for reciprocating movement with respect to said first body portion, said luminous means being mounted on said rod for movement therewith, said body including a panel portion, said panel portion including a series of spaced apertures arranged in a row parallel to the path of movement of said luminous means, and translucent lenses mounted in register with respective of said apertures, said lenses providing distinct indications of relative fuel economy, said luminous means being movable with respect to said apertures and lenses for changing the intensity of illumination thereof in response to changes in manifold depression.

* * * * *